United States Patent [19]

Huang

[11] 4,079,546
[45] Mar. 21, 1978

[54] GREENHOUSE-BULK CURING AND DRYING SYSTEM

[76] Inventor: Barney K. Huang, 5108 Kaplan Dr., Raleigh, N.C. 27606

[21] Appl. No.: 682,143

[22] Filed: Apr. 30, 1976

Related U.S. Application Data

[60] Continuation of Ser. No. 549,386, Feb. 12, 1975, abandoned, which is a division of Ser. No. 400,893, Sep. 26, 1973, Pat. No. 3,866,334.

[51] Int. Cl.$^2$ ............................................. A01G 9/00
[52] U.S. Cl. .................................................... 47/58
[58] Field of Search ................... 47/19, 17, 58; 34/93, 34/219, 233

[56] References Cited

U.S. PATENT DOCUMENTS

2,399,696  5/1946  Schreiber ............................. 47/19

*Primary Examiner*—Robert E. Bagwill
*Attorney, Agent, or Firm*—Larry L. Coats

[57] ABSTRACT

The present invention relates to a farm structure that may be utilized as either a curing and drying facility or as a plant growth facility. By making minor alterations the structure may be readily converted from a curing and drying facility to a greenhouse type plant growth facility, or vice versa. Thus, the structure becomes a multi-purpose farm structure that may be continuously and substantially utilized.

Moreover, the present invention relates to a method and structure for utilizing available solar radiation in curing and drying tobacco. Generally, the tobacco curing and drying structure comprises an enclosure adapted to support bulk tobacco therein. A combination air blower and heating system is disposed in said curing and drying structure and operative to force air through the bulk tobacco therein, the heating system being capable of heating the forced air as necessary to maintain desired environmental conditions within said curing and drying structure. Exteriorly, the tobacco curing and drying structure includes a transparent wall and roof structure which serves to transmit solar radiation into the interior of said structure. Heat associated with the solar radiation transmitted into the structure is ultimately transferred to the bulk tobacco therein for curing and drying the tobacco.

1 Claim, 7 Drawing Figures

GREENHOUSE-BULK CURING AND DRYING SYSTEM

This is a continuation, of application Ser. No. 549,386, filed 2-12-75 and (now abandoned which is a division of Ser. No. 400,893 filed 9-26-73, now U.S. Pat. No. 3,866,334.

BACKGROUND OF THE INVENTION

The present invention relates to a multi-purpose farm structure that may be utilized as either a curing and drying facility or as a plant growth facility. In addition, the present invention relates to a method and structure for fully utilizing available solar radiation in curing and drying crop material such as tobacco.

Bulk curing and drying of tobacco, as disclosed by F. J. Hassler in U.S. Pat. No. 3,105,713, is now a widely accepted method of curing and drying tobacco. In fact, in recent years large numbers of tobacco farmers, especially those with large tobacco acreage, have begun to use bulk curing mainly because of the substantial labor savings and the increased efficiency realized.

However, some tobacco farmers, especially those with relatively small tobacco acreage, have found it difficult to justify the initial investment required to purchase bulk tobacco barns and have found it even more difficult to justify a complete conversion from the conventional sticktype tobacco barn to bulk barns. Although the high initial cost is a major consideration, a related concern is the minimum utilization that can be made of conventional bulk tobacco barns. Presently, many bulk tobacco barns are primarily used during only the tobacco harvesting season which typically last for approximately six weeks, with little, if any, utilization the remaining portions of the year. Consequently, in such instances, the benefits realized from bulk curing and drying tobacco must almost alone justify the initial investment of the structure.

As noted above, bulk tobacco curing and drying is generally more efficient than the conventional stick barn. Efficiency is perhaps more important and of more concern today than in years past because of the presence of the much talked about "energy crisis." Because of the "energy crisis," there is a general fuel shortage which is affecting farmers as well as consumers in general. Many tobacco farmers are not sure they will be able to secure sufficient quantitites of fuel to cure and dry their present crops, and are vitally concerned about the future availability of fuel for such purposes. Therefore, in view of this fuel shortage, it is important that industry and farmers alike attempt to increase crop curing and drying efficiency and to conserve fuel when possible. Moreover, it is an appropriate time to consider alternative sources of energy, especially natural sources that are readily available and which are compatible to principles of crop curing and drying.

SUMMARY OF INVENTION

Basically the present invention relates to a farm structure that may be readily converted from a curing and drying facility to a plant growth facility, or vice versa. Thus, it follows that the structure can be utilized as a greenhouse type plant growth facility or as a curing and drying facility, consequently enabling the owner to realize continuous and substantial utilization of the structure.

The present invention also discloses a method and structure for fully utilizing the energy associated with available solar radiation to cure and dry bulk tobacco contained in the structure. By utilizing available solar radiation, the efficiency of the curing and drying structure is increased and less fuel is required for given quantities of tobacco cured and dried.

More specifically, the curing and drying structure of the present invention includes a transparent exterior generally surrounding the bulk tobacco contained therein. Interposed between the transparent exterior and the bulk tobacco in the preferred embodiment shown is a removable radiant heat absorber. The curing and drying structure also includes a combination air blower and heating system that is adapted to force air in a circulating fashion through bulk tobacco or crop material contained in the structure and to add heat as required to such forced circulating air. Generally, during curing and drying, the blower portion of the combination system continuously forces air through the bulk tobacco or crop material with the forced air being generally confined interiorly of the heat absorber.

In utilizing the thermal energy of available solar radiation in curing and drying tobacco, the available solar radiation is allowed to penetrate the transparent exterior of the curing and drying structure. Once the solar radiation has penetrated the transparent exterior, thermal energy associated therewith is absorbed within the curing and drying system. The thermal energy absorbed is thusly utilized within the structure in curing and drying the tobacco or crop material therein.

Moreover, because the curing and drying structure of the present invention has a light transmitting transparent exterior, the structure can be additionally utilized on the farm as a plant and seedling growth facility. To utilize the structure as a plant growth facility, the heat absorber used in curing and drying in the preferred embodiment is removed and minor interior alterations are made to accommodate seedlings or growing plants. When converted to a plant growing structure, the structure may be utilized to grow fruits, vegetables, and plants of all types, including tobacco plants. Consequently, the ability to utilize the curing and drying structure of the present invention as a plant growing structure enables the structure to be beneficially utilized on a year-around basis. The additional income derived from the full utilization of the structure will make it easier for more farms to justify the initial investment required for a curing and drying structure.

It is an object of the present invention to provide a multi-purpose farm structure than may be readily converted from a curing and drying crop facility to a plant growth facility.

Still a further object of the present invention is to provide a farm structure that may be utilized for different purposes during various production stages of a single crop. More specifically, the farm structure of the present invention may be used to grow plants in a controlled environment prior to transplanting, and after the transplanted plants have matured and been harvested, the same structure may be converted and utilized to cure and dry the harvested crop. Consequently, such a versatile structure has the effect of integrating and consolidating various crop production stages into a logical system.

It is also an object of the present invention to provide an economical crop curing and drying structure that utilizes available natural solar energy to increase the curing and drying efficiency of the structure, which consequently gives rise to a reduction in fuel required per unit quantity of crop material cured and dried.

A further object of the present invention is to provide a curing and drying structure wherein the heat utilized therein for curing and drying purposes is derived from both available solar radiation and the heat generated by a conventional heating system.

Still a further object of the present invention is to provide a method or process of curing and drying crop material by utilizing heat supplied by both available solar radiation and a conventional heating system wherein heat associated with said available solar radiation is continuously captured and utilized for curing and drying purposes while the conventional heating system is operative is supplement the solar heat (heat associated with the captured solar radiation) in order to maintain a desired temperature and quantity of heat within said curing and drying structure.

Another object of the present invention resides in the provision of a solar curing and drying structure having at least one curing and drying room therein for containing bulk crop material, and a solar energy transmitting and trapping roof and wall structure spaced outwardly of the bulk crop material contained in said curing and drying room, whereby during curing and drying air is continuously forced through the bulk material contained in said curing and drying structure and thermal energy transmitted and trapped is transferred to said system of air passing through said crop material.

A more specific object of the present invention is to provide a solar curing and drying structure having a transparent wall and roof structure spaced outwardly of at least one curing and drying room, and wherein a heat absorber is normally interposed between the transparent wall and roof structure and the curing and drying room, thereby giving rise to a dead air space between the transparent wall and roof structure and the heat absorber which provides some insulation of the curing and drying room from the outside climate.

It is a further specific object of the present invention to provide a solar curing and drying structure having an intermediate heat absorber disposed between bulk crop material within the structure and the transparent exterior thereof, whereby the combined functional effect of the transparent exterior and heat absorber is not only that of trapping or capturing available solar energy, but additionally the transparent exterior and heat absorber acts as an effective structure insulator and further confines the system of forced air to the area occupied by the crop material.

Other objects and advantages of the present invention will become apparent from a study of the following description of the accompanying drawings which are merely illustrative of the present invention.

THE STRUCTURE AS UTILIZED FOR CURING AND DRYING

Figure 1:
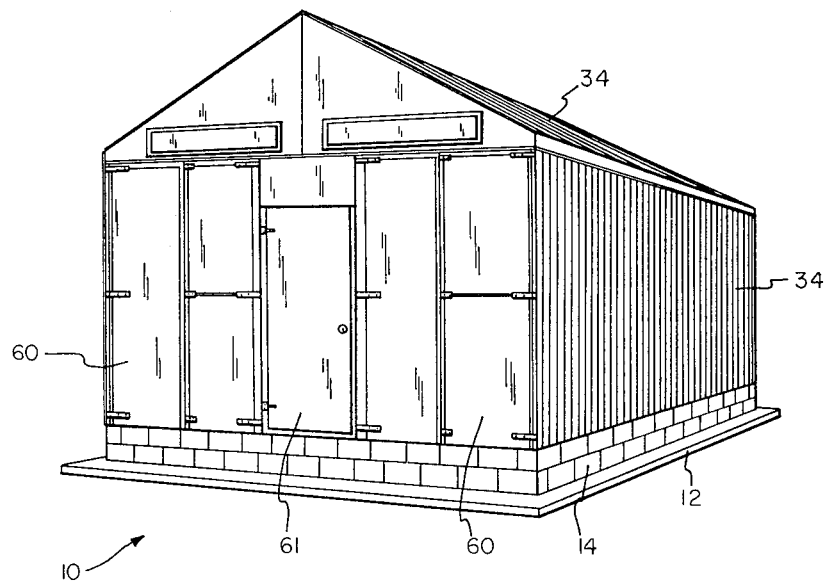
FIG. 1 is a perspective view of the structure of the present invention, as viewed from the front and to one side.
Figure 2:
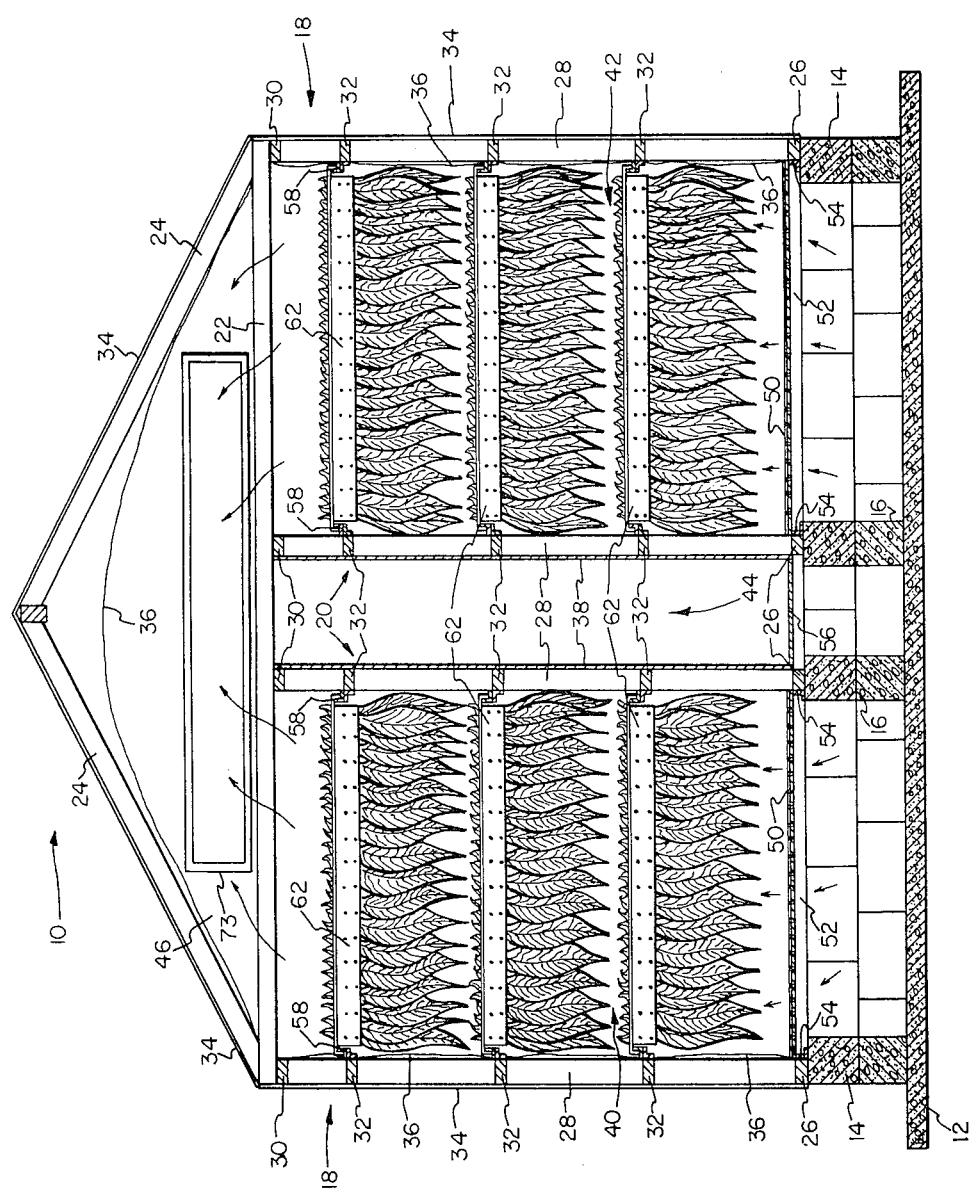
FIG. 2 is a cross sectional view of the structure illustrating its use as a tobacco curing and drying facility.

With further reference to the drawings, particularly FIGS. 1 and 2, the structure (hereafter referred to as either a curing and drying structure or as a plant growth structure) of the present invention is shown therein and indicated generally by the numeral 10.

Curing and drying structure 10 comprises a foundation including a generally flat concrete slab 12, an enclosed outer concrete block wall 14, and an inner block wall 16. The inner block foundation wall 16 terminates prior to reaching the rear most wall of the outer block wall 14, thereby defining an area in the rear of the structure which, as will become apparent from subsequent discussion, will serve as a furnace room for the combination air blower and heating system to be utilized within the curing and drying structure of the present invention.

Secured to the block foundation walls 14 and 16 is a plurality of laterally spaced longitudinally extending wall sections, these wall sections being referred to generally as outer wall sections 18 and inner wall sections 20. Extending transversely across the longitudinal wall sections 18 and 20 is a series of spaced ceiling joists 22. Fixed about the outer most top extremity of each ceiling joist is a rafter 24 that extends generally inwardly and upwardly where the inner most ends of lined rafters join with a ridge piece to form the roof of the curing and drying structure 10.

Therefore, it is appreciated that the basic frame structure of the curing and drying structure 10 is made up of the longitudinal wall sections 18 and 20, the ceiling joist 22 and the rafters 24.

Turning to a detailed discussion of the wall sections 18 and 20, it is seen from FIG. 2 that each wall section includes a bottom sill 26 that runs along an upper side of the particular concrete block wall foundation that the particular wall section overlies. Fixed to the sill 26 and extending vertically therefrom is a series of vertical studs 28, each stud being longitudinally spaced a predetermined distance relative to adjacent studs. A plate 30 is fixed to the upper end of the studs 28 and extends generally parallel with the sill 26, thereby forming the basic structure of each wall section.

Between respective vertical studs 28 of each wall section, there is provided a series of vertically spaced horizontal members 32. These horizontal members 32 serve to brace each wall section and further function to generally prohibit continuous vertical movement of forced air between respective studs.

With particular reference to the outer wall sections 18, it is seen that a transparent exterior 34 such as clear fiberglass is disposed about the outer side of each. The fiberglass exterior 34 utilized by the present curing and drying structure 10 is contemplated to have light transmitting characteristics, i.e., the ability to transmit natural sunlight through the outer walls 18 into the interior of the structure 10. Typically, the fiberglass exterior 34 is formed from panel sections of such material and secured to the outer side of each outer wall section 18. Although planar fiberglass could very well be used, fiberglass of a corrugated shape is preferable in that greater surface area is present for given areas of application and consequently more solar radiation can be intercepted. Where sheets of corrugated fiberglass are used, as opposed to planar sheets of fiberglass, it should be pointed out that it is preferable to interpose horizontal corrugated strips and vertical strips between the fiberglass and the outside of the outer wall sections 18. The presence of the horizontal corrugated strips and the vertical arcuate strips enables the corrugated fiberglass to be firmly secured to the outer wall structure and also tends to seal the corrugated fiberglass relative to the outer wall sections 18.

Continuing to refer to the detailed structure of the outer wall sections 18, it is seen that a removable or detachable heat absorber 36 is secured by pins or clips or other suitable detachable means to the inside of each outer wall section 18. As will be discussed in greater detail subsequently herein, the removable heat absorber 36 is preferably constructed of a black plastic-like material and acts to trap or capture the thermal energy associated with solar radiation transmitted through the fiberglass exterior 34.

The fiberglass exterior 34 is also secured about the roof of the curing and drying structure 10, with individual panels of fiberglass extending between and over respective rafters 24. Likewise, the heat absorber 36 also is present in the top area of the curing and drying structure and is generally disposed between the rafters 24 and the ceiling joist 22. As in the case of the heat absorber along the inside area of the outer wall sections 18, the heat absorber disposed in the upper area of the curing and drying structure 10 is removably mounted also.

Inner wall sections 20 are constructed the same as outer wall sections 18 and further include vertical panels 38 secured about the inner side thereof, with such panels being preferably removably mounted. Consequently, the presence of the wall sections 18 and 20 define two curing and drying rooms or chambers 40 and 42, and further define an access room 44 which as shown in the drawings generally extends between the two curing and drying rooms 40 and 42.

Spaced forwardly of the rear of the curing and drying structure 10 is a transverse furnace wall 46 that extends across the structure and extends from the top level of the concrete block foundation walls 14 and 16 to the rafters 24. The presence of the furnace wall 46 effectively divides the curing and drying rooms 40 and 42 from a furnace room 48 (FIG. 3) spaced rearwardly therebehind.

A perforrated floor 50 is disposed between respective inner and outer wall sections 18 and 20, the perforrated floor being supported above the concrete slab 12 by portions of the concrete block foundation walls 14 and 16. The perforrated floor generally extends in each curing and drying rooms 40 and 42 from the furnace wall 46 to the front of the curing and drying structure 10. More particularly, the perforrated floor 50 is secured to a series of tranversely extending and longitudinally spaced floor joist 52, the floor joist being in turn secured about opposite ends to a pair of angle iron side supports 54. As seen in FIG. 2, the angle iron supports 54 rest on the concrete block foundation and lie adjacent a respective sill 26 of a particular wall section. As will become apparent from further discussion herein, the area between the perforrated floor 50 and the concrete slab 12 serves to accept forced air and to generally confine the air therein such that the air may be evenly distributed up through the perforated floor 50 in each curing and drying room for curing and drying the tobacco or crop material contained therein.

The middle access room 44 also includes a floor 56 which extends generally between the inner foundation block wall 16.

Each curing and drying room 40 and 42 includes a series of tier rails 58, the tier rails being vertically spaced on the inner side of the outer wall sections 18 and on the outer side of the inner wall sections 20. Preferably, the tier rails 58 ae secured along the line of the horizontal members 32 disposed in each wall section. In each room the pair of tier rails disposed at the same general level support conventional bulk racks that are slideable thereon, the bulk racks being indicated generally by the numeral 62. Details of the individual bulk rack are not shown herein because such is not material to the present invention and the structure of bulk racks is well known in bulk tobacco curing. But for a more detailed and unified understanding of the individual bulk racks, one is referred to the disclosure of U.S. Pat. No. 3,105,713 which illustrates in detail a bulk rack structure that is suitable for use with a bulk curing tobacco structure.

Each curing and drying rooms 40 and 42 include a front double-door set 60, each double-door set includes a pair of oppositely hinged doors and an associated latch mechanism for securing the doors in a closed position. Also, the front of the curing and drying structure 10 is provided with an access door 61 that is operative to enclose the access room 44.

Figure 3:
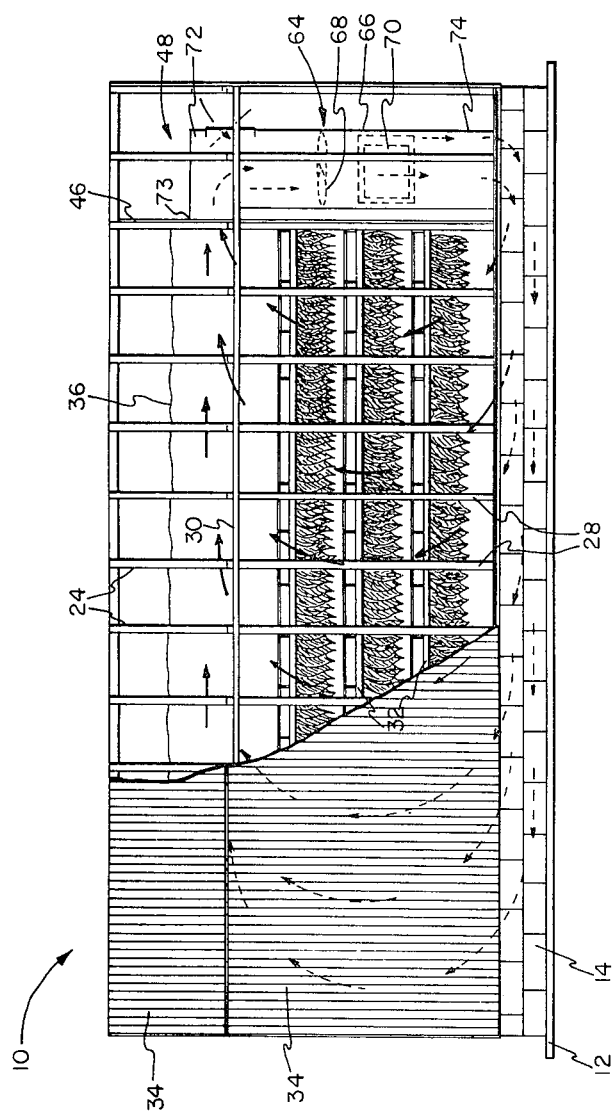
FIG. 3 is a side elevational sectional view of the structure, as utilized for curing and drying, with portions removed to better illustrate the internal portions of the structure as utilized for curing and drying.
Figure 4:
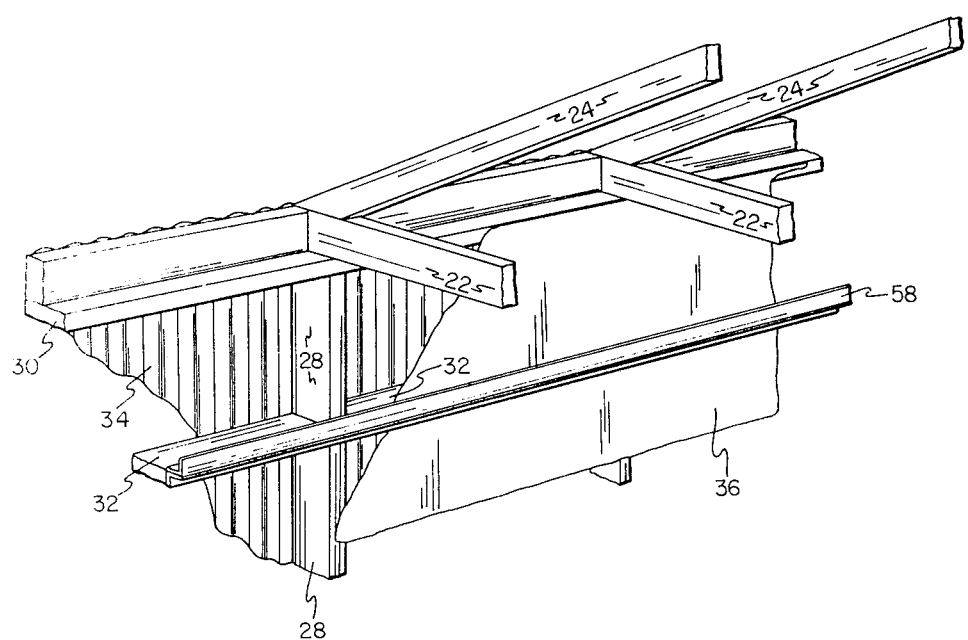
FIG. 4 is a fragmentary view illustrating the outer wall sections of the structure, as utilized for curing and drying, that are spaced outwardly of the curing and drying rooms.

With reference to FIG. 3 and particularly the furnace room 48, there is provided therein a conventional air blower and heating system indicated generally by the numeral 64. Although the combination air blower and heating system 64 is conventional and is presently used in bulk tobacco curing, a brief description thereof and its relationship to the curing and drying structure 10 of the present invention will follow.

The combination blower and heating system 64 basically comprises a cylindrical housing 66 having an upper intake duct assembly 72 communicatively connected thereto and a lower exhaust duct assembly operatively associated with the lower portions thereof for channeling the forced air generated by the system under the perforrated floor 50 of each curing and drying room. The upper intake duct assembly 72 includes adjustable dampers on the rear sides thereof. The front portion of the duct opening 72 is cummunicatively connected through opening 73 of the furnace wall 46 to each of the curing and drying rooms, and accordingly, allows air within the curing and drying structure to be recirculated through the heating system 64. The dampers on the rear side of the upper intake duct assembly 72 is open to the furnace room 48. Therefore, in summary, the upper intake duct assembly 72 is operative to circulate both air from within the curing and drying structure 10 and furnace room, and various combinations of each which gives some degree of control over the humidity and other environmental conditions within the curing and drying structure.

Cylindrical housing 66 includes an electric powered propeller 68 axially mounted in the top portion thereof.

Disposed below the propeller 68 within the cylindrical housing 66 is a burner which may be either gas or oil fired. Although not specifically shown and illustrated herein, the burner is normally operatively controlled by an automatic temperature control system which generally senses the temperature within the curing and drying structure and ignites the burner at appropriate time intervals to maintain a desired temperature therein. Moreover, such temperature control systems preferably include an automatic advance temperature control which can be set to increase the temperature within the curing and drying strucute at a desired time rate.

METHOD OF UTILIZING AVAILABLE SOLAR RADIATION IN CURING AND DRYING TOBACCO

In the way of background, curing and drying of tobacco has traditionally involved three phases: (1) yellowing, (2) leaf drying, and (3) stem drying (also known as killing out). Yellowing is always the first phase and is generally accomplished by subjecting the tobacco to a temperature of 90° to 110° F for a time period ranging generally from 48 to 72 hours. Leaf drying, phase 2, follows the yellowing phase and is particularly characterized by slowly increasing the temperature within the curing and drying structure, normally about two degrees per hour and generally through a temperature range of 110° to 135° F. Finally, after leaf drying, the stem drying or killing-out phase is begun. Again the temperture is slowly increased, about 2° to 3° F per hour, until the temperature reaches approximately 170° F at which point the curing and drying operation is normally completed. This generally summarizes the tobacco curing and drying phases as presently practiced. But it should be noted that curing and drying procedures for tobacco may vary for different primings and different maturity levels.

Before commencing the curing and drying operation, tobacco is placed in the curing and drying structure 10 in bulk form which may entail packing the tobacco leaves in conventional bulk racks, as shown in FIG. 2, or packing the tobacco leaves in a modular container-like structure.

Once the tobacco has been placed in the curing and drying structure, then the combination air blower and heating system 64 is activated. Actuation of the blower and heating system 64 results in air being introduced into the system and forced by the propeller 68 downardly through the housing 66 towards the concrete slab 12. Upon reaching the concrete slab 12 or the vicinity thereof, the system of forced air is constrained to change direction and to move forwardly (relative to the curing and drying structure 10) between the floor 50 and the concrete slab 12. As the propeller 66 continues to drive air downwardly through the housing 66, the air under the perforated floor 50 is forced upwardly therethrough and through the overlying bulk tobacco. After passing through the uppermost level of the tobacco, the forced air may exit the curing and drying structure through front exhaust louvers provided in appropriate areas within the structure. By adjusting or closing such louvers, various quantities of air may be recirculated back through the blower and heating system 64. Therefore, it is seen that a system of forced air is continuously passing through the bulk tobacco and from the previous discussion relative to the structural embodiment illustrated in FIG. 2, it is seen that the system of forced air within the curing and drying structure is generally confined and bounded by the heat absorber 36. Consequently, the heat absorber 36, especially that portion disposed adjacent the outer wall sections 18, acts to confine the system of forced air to the area occupied by the bulk tobacco and thereby assures a relatively uniformed distribution of heat and air through the tobacco. Moreover, it might be mentioned at this time that the heat absorber 36 also functions to shield the tobacco from excessive exposure to the sunlight, thereby tending to prohibit bleaching and adverse effects of the sunlight.

While the system of forced air is continuously moving through the bulk tobacco, it is normally necessary to transfer heat to the system to effectuate curing and drying. In accordance with the method of the present invention, the heat associated with available solar radiation is the first priority source of heat, i.e., when available, heat from solar radiation will be transferred to the curing and drying system prior to generating heat with conventional means such as the combination blower and heating system 64.

In this regard, available solar radiation is allowed to penetrate the transparent exterior 34 of the curing and drying structure 10. Once the heat bearing waves of solar radiation have passed through the transparent exterior 34, they are captured or absorbed within the curing and drying system, thereby resulting in heat being added to the system for curing and drying purposes. Some measure of temperature control can be achieved by exhausting quantities of air from the system while admitting outside or furnace room air into the same system.

More particularly, with regard to the illustrative embodiment of FIG. 2, available solar radiation is transmitted through the transparent exterior 34 of the curing and drying structure. Upon reaching the heat absorber 36, which is preferably of a black, heavy-duty plastic material or any material with high thermal absorbity, the thermal energy associated with the transmitted solar radiation is captured or absorbed thereby. It should be noted that the heat absorber 36 may be relatively air tight, thereby giving rise to a dead air space between the transparent exterior 34 and the heat absorber 36 which in itself is an effective insulator for the curing and drying structure. The heat captured or absorbed by the heat absorber 36 is generally transferred by convection to the system of forced air passing along the innermost sides thereof, or the side opposite the adjacent transparent exterior 34.

If during any phase of curing and drying of the tobacco, the available solar radiation is insufficient to maintain the desired temperature dictated by the particular curing and drying phase, then the heating element of the blower and heating system 64 is actuated to supplement the heat attributable to solar radiation. Consequently, it is seen that the method of curing and drying tobacco, as disclosed herein, entails the use of available natural solar radiation as a priority source of heat, and further utilizes, as necessary, a secondary source to supplement the solar heat for considerable savings in fuel.

ALTERNATIVE BULK TOBACCO HANDLING SYSTEM

Figure 6:
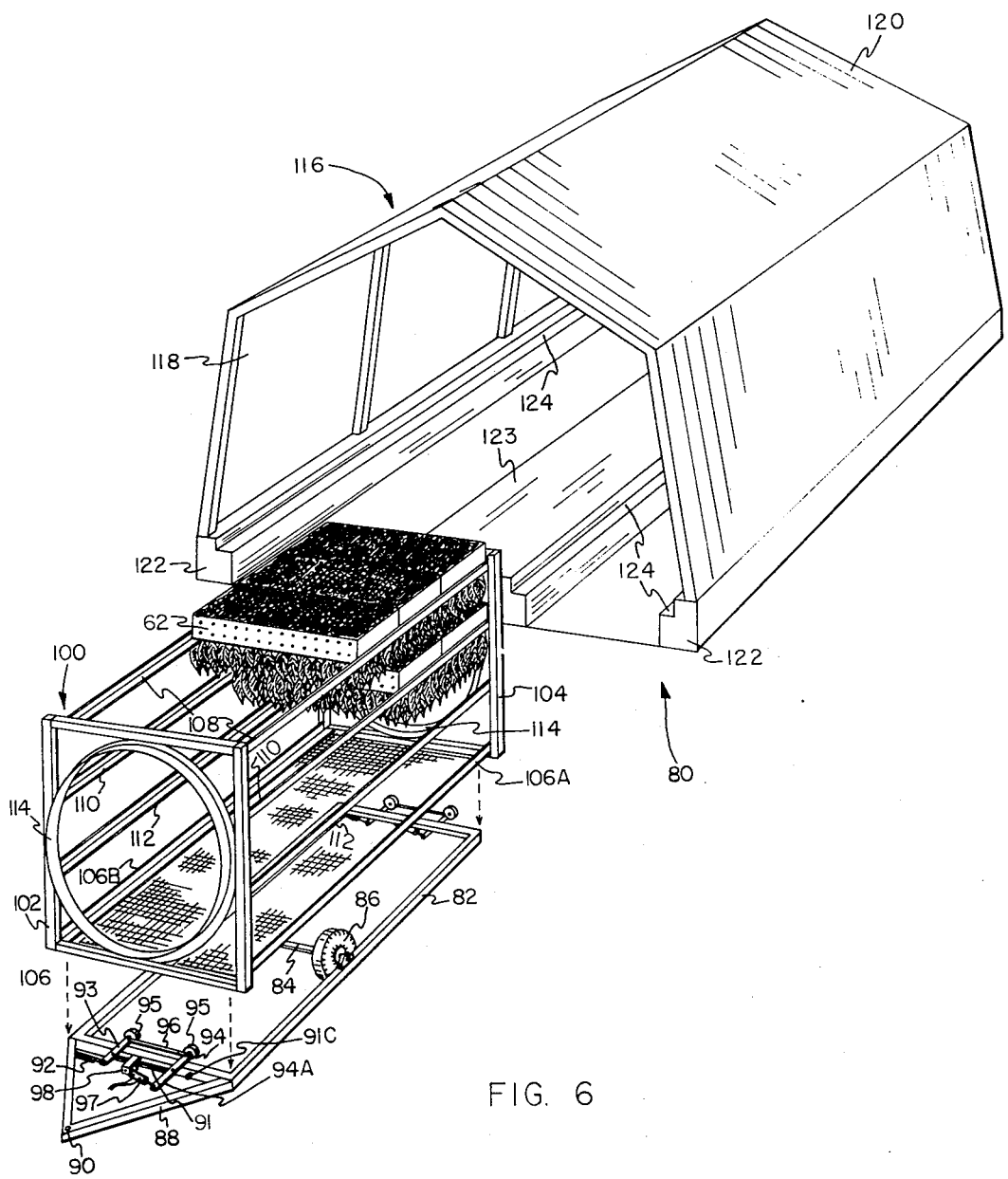
FIG. 6 is a perspective view of an alternative system for handling the bulk crop material to be placed within a modified curing and drying structure.

With reference to FIG. 6, a modified mobile bulk tobacco handling system 80 is shown therein and is compatible with a modified curing and drying structure indicated generally by numeral 116 therein. Referring to the mobile bulk tobacco handling system 80, it is seen that the same comprises a mobile trailer having a main frame 82 supported by a transversely extending axle 84 having a pair of wheels 86 rotatively mounted on opposite ends thereof. Extending forwardly from the front of the main frame 82 is a tongue 88 having a clevis 90 integrally formed on the forwardmost end thereof and adapted to be connected to the draw bar of a tractor (not shown).

Removably mounted to the trailer main frame 82 is a bulk tobacco container or containing frame indicated generally by the numeral 100. Referring to the bulk tobacco container frame 100 in greater detail, it is noted that the same comprises a pair of end rectangular frame 102 and 104, each rectangular frame being oriented in a vertical plane and longitudinally spaced relative to the other. Co-axially secured to each rectangular and frame 102 and 104 is a circular roll collar 114. Extending between the rectangular end frames 102 and 104 is a series of tier rail sets, the tier rail sets being denoted by the numerals 108, 110 and 112. It is seen from FIG. 6 that each set of tier rails includes a pair of laterally spaced longitudinally extending rails that are generally disposed in co-planar relationship to each other and adapted to support conventional bulk racks such as shown in FIG. 2.

Finally the bulk container frame 100 is provided with a bottom screen 106 that extends between the rectangular end frames 102 and 104 and is bounded on each side by side rails 106a and 106b.

Mounted on both the front and rear ends of the trailer frame 82 is means for elevating the bulk tobacco containing frame 100 relative to the main frame 82 of the mobile trailer. Viewing the elevating means in detail, it is seen that such comprises a slide bar 91 slidably mounted for back and forth movement on the main frame 82 and biased to one side by a spring 92 which is anchored at one end to the main frame of the mobile trailer. A stop 91c is fixed on the opposite side of spring 92 and is engagable with slide bar 91 for limiting the movement thereof. Pivotably mounted at spaced apart points on the slide bar 91 is a pair of linked rocker arms 93 and 94 which are adapted to swing in a plane that extends generally transverse to the mobile trailer. Rotatively mounted to the normal upper ends of each rocker arm 93 and 94 is a roller 95 which is aligned to engage the roll collar 114 which projects slightly from the rectangular frames 102 and 104 of the bulk containing frame 100. Interconnecting the rocker arms 93 and 94 is an interconnecting link 96, the interconnecting link assuring that the rocker arms 93 and 94 maintain the same relative relationship to each other.

A remotely controlled hydraulic cylinder 97 is anchored to an anchor clamp 98 which is in turn fixed to the main frame 82 of the trailer. Extending from the opposite side of the hydraulic cylinder 97 is the piston rod thereof which is pivotably connected to a lower extension 94a extending from the rocker arm 94. It should again be pointed out that this mechanism just described is disposed on both the rear and front ends of the trailer and is engageable with the roll collar 114 disposed on each end of the bulk container frame 100 for raising the latter upwardly relative to the trailer.

Briefly, to elevate the bulk container frame 100, the remote control hydraulic cylinder 97 is actuated causing the piston rod to be extended and the rocker arm 94 to be rotated counterclockwise as viewed in FIG. 6. The counterclockwise movement of rocker arm 94 results in the interconnecting link 96 being moved laterally and consequently the other rocker arm 93 being also rotated counterclockwise. As the rocker arms 93 and 94 are rotated, the roller 95 rotatively mounted on each upper end thereof engages the roll collar 114 of the container frame 100 and lifts or raises the latter relative to the trailer. It is seen that as the remotely control hydraulic cylinder 97 is actuated that the slide bar 91 may likewise be shifted along the main frame 82 towards the right as viewed in FIG. 6. The shifting of the slide bar 91 during the raising of the bulk container frame 100 tends to maintain the bulk container frame 100 in a generally centered position above the trailer. When lowering the bulk container frame 100, it is appreciated that the hydraulic cylinder 96 must be appropriately actuated and while the container frame 100 is being lowered, the spring 92 acts to pull the slide bar 91 back to its original position.

Turning briefly to the modified curing and drying structure 116 that is particularly adapted to be compatible with the bulk tobacco handling system 80 just described, it is seen that the structure includes a transparent wall and roof structure 118 and 120, respectively. Extending generally longitudinally about the lower portion of the structure is a pair of outer foundations 122 and an inner foundation 123. Formed about the upper outer edges of the inner and outer foundation 122 and 123 is an angle ledge 124 for supporting the bulk tobacco container frame 100.

More particularly, tobacco may be packed into individual racks 62 and placed transversely across respective tier rails of the bulk tobacco containing frame 100. To place the tobacco in the curing and drying structure 116, the mobile trailer with the bulk frame 100 supported thereabove is positioned in front of the curing structure as shown in FIG. 6. By actuating the elevating means associated with the bulk handling system 80, the entire bulk tobacco containing frame 100 is elevated a predetermined distance above the main frame 82 of the trailer. As seen in the drawings, the trailer is slightly more narrow than the bulk containing frame 100. Therefore, once the bulk tobacco containing frame 100 is elevated, the trailer can be backed into the modified curing structure 116. Once properly positioned within the curing and drying structure, the elevating means associated with the bulk tobacco handling system is lowered, allowing the outer edges of the bulk tobacco containing frame 100 to be engaged and supported by corresponding angle ledges 124 formed about the foundation 122 and 123. Because the angle ledges 124 are generally positioned above the level of the trailer, it is seen that the trailer can be readily removed from the curing and drying structure. Also, it should be apparent that the bulk tobacco containing frame 100 can be readily retrieved once the tobacco contained therein is cured and dried by simply reversing this operation.

Figure 7:
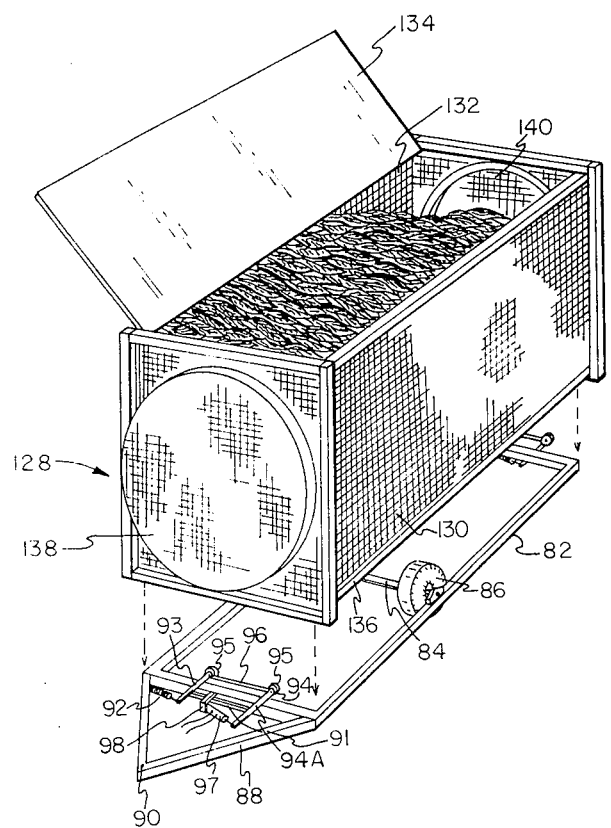
FIG. 7 is a modification of the handling system shown in FIG. 6.

FIG. 7 illustrates a modification of the bulk handling system just described and shown in FIG. 6. Instead of racking the tobacco leaves in a conventional bulk tobacco rack such as that denoted by the numeral 62 in FIG. 2, the modified handling system indicated generally at 128, is adapted to directly receive random tobacco leaves at the field. Once placed in the modified handling system at the field, the entire system can be transported to the curing and drying structure. In the loading or transport mode, as shown in FIG. 7, the plane of the individual random tobacco leaves assume generally horizontal positions with the leaves being piled one over the other.

With reference to the modified bulk handling system 128 in greater detail, it is observed that when viewed in the loading or transport mode (FIG. 7), the same basically comprises a pair of perforated screen-like sides 130 and 132. Disposed about the other two sides of the modified system 128 are a pair of imperforated retainers 134 and 136. Such imperforated retainers may be of the nature of panels or may be in the form of heavy duty reenforced plastic-like material similar to the heat absorber 36 already discussed. Since the modified system 128 would preferably be loaded from the top, it follows that the top imperforated retainer 134 would be removably mounted to accommodate loading and unloading. In addition, the modified system 128 is provided with imperforated end retainers or panels 138 and 140.

To cure and dry tobacco within the modified system, it becomes necessary to rotate the entire containing unit 90 degrees before stationing the same within the curing and drying structure. By rotating the entire system 90 degrees, it is seen that the plane of the individual tobacco leaves is rotated accordingly such that the leaves which were formerly disposed in generally horizontal positions are now oriented in upright positions with the plane of the individual leaves being generally vertically disposed. The repositioning of the leaves by rotating the entire modified system 128 ninety degrees enables air to more up therethrough during the curing and drying operation. It will be observed that in the curing and drying mode the perforated screen-like sides 130 and 132 become the top and bottom of the modified system 128 and because of the perforations therein allow air to readily pass vertically therethrough. Also, the imperforated retainers 134 and 136 now become the vertical sides of the system and generally function to retain the air and assure that the air moves vertically through the tobacco contained within the container-like structure of the modified system 128.

To effectuate rotation of the modified system 128, the elevating means associated with the trailer previously described is actuated. The actuation of the elevating means raises the container-like structure of the modified system 128 a predetermined distance above the main frame 82 of the trailer. Once raised, the container structure may be rotated manually or by a power source such as a hydraulic motor. In either case, the roll collar 114 disposed about opposite ends of the modified system preferably engages rollers 95 stationed on the rocker arms 94 and 195. This enables the container portion of the system to be easily and conveniently rotated above the trailer. Just as described before, the container portion of the modified system 128 may be placed within the curing and drying structure and retrieved therefrom after curing by backing the trailer within the structure and manipulating the elevating means so as to position or retrieve the container portion relative to the angle ledges 124 of the curing and drying structure shown.

UTILIZATION OF THE STRUCTURE AS A PLANT GROWTH FACILITY

Figure 5:
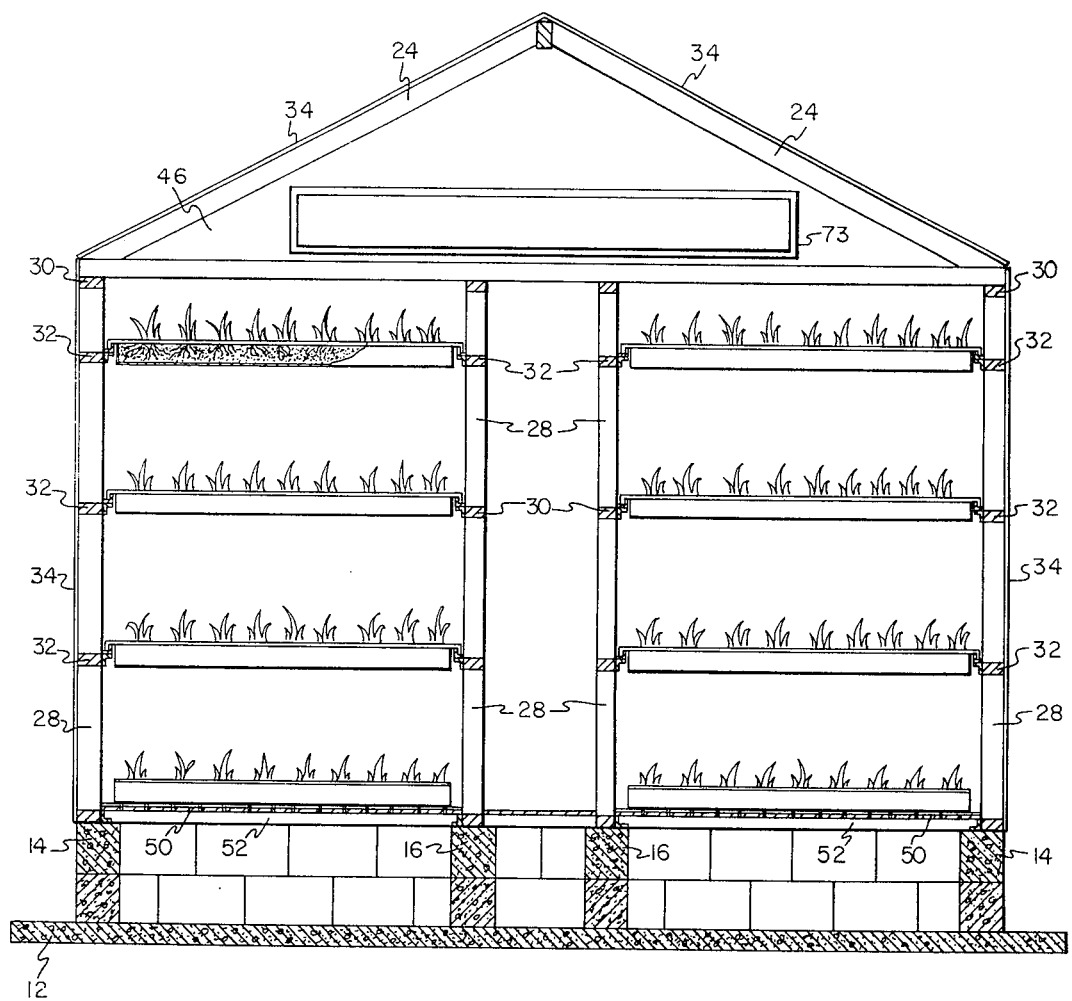
FIG. 5 is a cross sectional view, similar to FIG. 2, of the structure of the present invention with the structure being converted to a plant growing facility.

Because the curing and drying structure disclosed herein includes a fiberglass-like transparent exterior structure, it follows that the structure could, with minor alterations, be used as a plant growth facility. The use of the structure as a plant growth facility as illustrated in FIG. 5. Although the structure when utilized as a growth facility could accommodate various types of fruits or vegetables, the particular illustration herein shows the structure used for growing tobacco plants prior to transplanting in the field. Therefore, when used to grow tobacco plants, the structure tends to combine and integrate various crop operations in the total production of the tobacco by enabling several distinct operations to be carried out and performed within one structure.

This arrangement not only provides a fully controlled environment to eliminate any loss due to insect and plant disease, but also naturally provides $CO_2$ enrichment for accelerated plant growth. The unique feature of this system is that the $CO_2$ enrichment process is automatically provided with the heating process during the winter use of the structure.

To modify the curing and drying structure 10 and to convert the same to a growth facility, the first step is to remove the heat absorber 36. This allows the sunlight to penetrate through the transparent exterior and to directly reach the plants therein. Also, it is desirable to provide an auxiliary water sprinkling system and it also might be desirable to provide artifical lighting where the structure as shown in FIG. 5 is adapted to support a series of vertically spaced plant beds.

Viewing the modification made to the curing and drying structure in FIG. 5, it is seen that the series of panels are placed between respective tier rails to support the plant beds. It is noted here that soil may be placed directly on the panels, or alternatively, a potted plant form system such as shown and disclosed in U.S. Pat. No. 3,712,252 could be supported. At the present time, it would appear that the use of potted plants would be more compatible to automatic transplanting of the type shown and disclosed in U.S. Pat. No. 3,446,164.

When utilized as a growth facility, the combination air blower and heating system 64 is used to control the environment within the structure to properly grow the plants therein. Therefore, it is appreciated that there is very little expense or effort in readily converting the curing and drying structure to a structure that will grow plants in a controlled environment.

Besides growing tobacco plants, the converted facility may be used to grow other horticultural crops, fruits or vegetables such as tomatoes. In this case, the plant bed panels might not be used as the tomatoes could be planted and supported by the perforated floor and allowed to grow orderly within the structure, as for example, in a trellis manner.

Finally it should be noted that while using the structure as a plant growth facility the middle access room 44 may be utilized to inspect or treat the growing plants in rooms 40 and 42.

Therefore, from the foregoing discussion, it is apparent that the structure of the present invention has utility both as a curing and drying structure and as a growth or greenhouse type structure. By utilizing the structure for other purposes besides simply crop curing and drying, the farmer can more likely justify the initial investment since he can spread or apportion the total investment to more than one income producing crop.

In addition, the curing and drying structure itself makes a substantial advancement in curing and drying bulk tobacco. The use of solar radiation by the structure to actually cure and dry the tobacco crop therein reduces the total cost of curing and drying given quantities of tobacco and accordingly increases the efficiency of the curing and drying structure. Moreover, the transparent exterior of the curing and drying structure of the present disclosure lends itself to a simple and relatively inexpensive construction. In this regard, it is believed that the incorporation of the transparent exterior structure into a curing and drying structure will result in a relatively inexpensive curing and drying structure that will be affordable by more farmers.

The terms "upper", "lower", "forward", "rearward", etc., have been used herein merely for the convenience of the foregoing specification and in the appended claims to describe the multi-use farm structure and its parts as oriented in the drawings. It is to be understood, however, that these terms are in no way limiting to the invention since the structure may obviously be disposed in many different positions when in actual use.

The present invention, or course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

What is claimed is:

1. A method of growing and curing tobacco wherein dual utilization is made of a combination convertible greenhouse-bulk curing farm structure having a transparent wall and roof, and a forced air environment control system associated therewith, said method of growing and curing tobacco comprising the steps of:
   (a) utilizing the combination convertible greenhouse-bulk curing farm structure as a seedling growth facility to grow tobacco seedling in a controlled environment until said seedling mature into a relatively small plant;
   (b) removing said plants from said combination greenhouse-bulk curing farm structure and transplanting the plants in a field, after which the tobacco plants are harvested at appropriate maturity stages;
   (c) converting the greenhouse-bulk curing farm structure from a seedling growth facility to a bulk tobacco curing and drying facility;
   (d) placing the harvested tobacco into bulk supporting means;
   (e) Placing said bulk supporting means into the greenhouse-bulk curing farm structure which has been converted into a bulk curing and drying facility; and
   (f) curing said bulk tobacco in said converted greenhouse-bulk curing farm structure, whereby said farm structure is utilized for the dual purpose of growing tobacco seedlings and curing and drying the harvested tobacco.

* * * * *